US008463821B2

(12) United States Patent
Lubbers et al.

(10) Patent No.: US 8,463,821 B2
(45) Date of Patent: Jun. 11, 2013

(54) AUTOMATIC GENERATION AND PUBLICATION OF ONLINE DOCUMENTATION

(75) Inventors: Jedidja Lubbers, Oregon House, CA (US); Vivek Kumar, Jharkhand (IN); Ravinder Pal Singh Sidhu, Punjab (IN); Theresa M. Robertson Bandy, Champaign, IL (US); Robert Crews, San Carlos, CA (US); Edgar S. Gilchrist, Portsmouth, NH (US); Arumugam Thiravallur Palani, Andhra Pradesh (IN); Phaneendra Reddy, Hyderabad (IN); Antonio Romero, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 12/103,648

(22) Filed: Apr. 15, 2008

(65) Prior Publication Data
US 2009/0259681 A1 Oct. 15, 2009

(51) Int. Cl.
G06F 7/00 (2006.01)
G06F 17/30 (2006.01)
(52) U.S. Cl.
USPC .......................................... 707/802; 707/793

(58) Field of Classification Search
None
See application file for complete search history.

(56) References Cited

U.S. PATENT DOCUMENTS

| 6,157,392 | A  | * | 12/2000 | McKeeth ....................... 345/473 |
| 6,493,734 | B1 | * | 12/2002 | Sachs et al. ....................... 715/212 |
| 7,395,273 | B2 | * | 7/2008  | Khan et al. ............................. 1/1 |
| 7,464,326 | B2 | * | 12/2008 | Kawai et al. ................... 715/205 |
| 7,624,173 | B2 | * | 11/2009 | Bary et al. ...................... 709/224 |
| 2006/0048096 | A1 | * | 3/2006 | Jiang et al. ...................... 717/115 |
| 2006/0088027 | A1 | * | 4/2006 | Becker .......................... 370/352 |
| 2007/0016848 | A1 | * | 1/2007 | Rosenoff et al. ............ 715/501.1 |
| 2007/0101259 | A1 | * | 5/2007 | Grigoriadis et al. .......... 715/517 |
| 2008/0010311 | A1 | * | 1/2008 | Kon et al. ...................... 707/102 |
| 2008/0201450 | A1 | * | 8/2008 | Bong et al. ..................... 709/219 |
| 2008/0244429 | A1 | * | 10/2008 | Stading ......................... 715/764 |
| 2009/0187797 | A1 | * | 7/2009 | Raynaud-Richard et al. .. 714/57 |
| 2010/0063960 | A1 | * | 3/2010 | Lehto ............................ 707/621 |

* cited by examiner

*Primary Examiner* — Khanh Pham
*Assistant Examiner* — Azam Cheema
(74) *Attorney, Agent, or Firm* — Miles & Stockbridge P.C.

(57) ABSTRACT

Systems and methods are provided that build and publish online documents. Source files of the online documents are automatically built into a book and published on a web site for review. A report regarding the build is provided to the author of the documents. The author can use the report to determine whether the build was successful, and whether manual intervention is necessary. The books are also archived.

19 Claims, 18 Drawing Sheets

Oracle® Application Server Portal Configuration Guide
10g Release 2 (10.1.4)
B19305-03

[Home]  [Solution Area]  [Index]

▲
Next

Contents

List of Examples
List of Figures         } Links 703
List of Tables

Title and Copyright Information

Preface

Audience
   Documentation Accessibility
   Related Documents
   Conventions

What's New in Oracle Application Server Portal Configuration?

New Features Introduced with OracleAS Portal 10g Release 2 (10.1.4)
   New Features Introduced with OracleAS Portal 10g Release 2 (10.1.2)

701 HTML UI

Figure 7

Build Report for Library B32124-01 (Oracle® Fusion Middleware Online Documentation Library)

Library Descriptor   1001 Library Build Report UI   1210   1220   1230   1240   1250

| Doc ID, Part Number & Title | Last Build | Status | Build Report |
|---|---|---|---|
| ADFDI (E10139-01) Oracle® Fusion Middleware Desktop Integration Developer's Guide for Oracle Application Development Framework | Thu 28-FEB-2008 15:31:31 PST | ! | Details |
| ADFFD (B31974-01) Oracle® Fusion Middleware Fusion Developer's Guide for Oracle Application Development Framework | Thu 28-FEB-2008 00:28:30 PST | ✖ | Details |
| ADFMB (E10140-01) Oracle® Fusion Middleware Developer's Guide for Oracle Application Development Framework Mobile | Wed 27-FEB-2008 21:45:02 PST | | Details |
| ADFTU (E10271-01) Oracle® Fusion Middleware Tutorial for Oracle Application Development Framework | Wed 27-FEB-2008 21:23:44 PST | | Details |
| ADFUI (B31973-01) Oracle® Fusion Middleware Web User Interface Developer's Guide for Oracle Application Development Framework | Wed 27-FEB-2008 22:53:46 PST | ! | Details |
| ADXDK (B28394-03) Oracle® XML Developer's Kit Programmer's Guide | Thu 28-FEB-2008 05:07:03 PST | | Details |
| ASADM (E10105-01) Oracle® Fusion Middleware Administrator's Guide | Wed 27-FEB-2008 22:03:20 PST | | Details |
| ASBPR (E10107-01) | Mon 19-MAR-2007 21:07:28 PST | | Details |
| ASCON (E10103-01) Oracle® Fusion Middleware Concepts | Wed 27-FEB-2008 23:55:08 PST | | Details |

Figure 12

All ASADM (E10105-01) Builds

| Build | Status | Details |
|---|---|---|
| Wed 27-FEB-2008 22:03:20 PST | ● | Read file |
| Tue 26-FEB-2008 22:01:33 PST | ● | Read file |
| Mon 25-FEB-2008 22:30:13 PST | ● | Read file |
| Fri 22-FEB-2008 23:28:49 PST | ● | Read file |
| Fri 22-FEB-2008 13:55:13 PST | ● | Read file |
| Thu 21-FEB-2008 22:21:14 PST | ⚙ | Read file |
| Wed 20-FEB-2008 22:41:41 PST | ● | Read file |
| Mon 18-FEB-2008 22:33:29 PST | ● | Read file |
| Sun 17-FEB-2008 22:15:43 PST | ⊕ | Read file |
| Sat 16-FEB-2008 22:44:44 PST | ⊕ | Read file |
| Fri 15-FEB-2008 22:31:12 PST | ● | Read file |
| Fri 15-FEB-2008 01:41:20 PST | ⊖ | Read file |
| Wed 13-FEB-2008 23:04:52 PST | ⚙ | Read file |
| Wed 13-FEB-2008 05:30:15 PST | ⊖ | Read file |
| Mon 11-FEB-2008 23:04:57 PST | ⚙ | Read file |
| Sun 10-FEB-2008 22:58:24 PST | ⊕ | Read file |
| Sat 9-FEB-2008 23:25:29 PST | ● | Read file |
| Fri 8-FEB-2008 23:11:57 PST | ● | Read file |
| Thu 7-FEB-2008 23:26:15 PST | ● | Read file |
| Thu 7-FEB-2008 11:12:58 PST | ● | Read file |

1310 1320 1330 1340

1301 Build Report UI

Figure 13

Detailed Build Report for JPSDG (E10148-01)

Primary author: peter.lubbers@oracle.com lalithashree.rajesh@oracle.com promila.chitkara@oracle.com Build started: Thu 28-FEB-2008 01:13:06 PST. Build ended: Thu 28-FEB-2008 02:37:29 PST. Total build time: 01:24:23.

View Book : HTML | PDF | Oracle Review | ZIP | Oracle Help Jar | Volume 1 (PDF) | Volume 2 (PDF) | Volume 3 (PDF)

Build Details

| Event | Status | Additional Info |
|---|---|---|
| STH File Verification | ◐ | Details |
| Volume and Cover/Spine Verification | ◐ | Details |
| Chapters, Graphics, and Color Verification | ! | Details |
| XML Build | ◐ | Details |
| XHTML Build | ◐ | Details |
| Oracle Help Build | ◐ | Details |
| PDF Build | ◐ | Details |
| PDF File Copy | ◐ | n/a |
| Oracle Review | ◐ | Details | Review |
| Multivolume Generation | ◐ | Details |

QA Details

| Event | Status | Additional Info |
|---|---|---|

1401 Detailed Build Report UI

Figure 14A

QA Details

| Event | Status | Additional Info | | |
|---|---|---|---|---|
| Archiver Zip Staging Report | 🔵 | | | |
| OAC Detailed Report | 🔵 | Details | | |
| | | OAC: Definitive Violations | ❌ | Details |
| | | OAC: Triggered Violations | ❌ | Details |
| | | OAC: Manual Inspection Required | 🔵 | Details |
| HTML QA Detailed Report | 🔵 | | | |
| | | HTML QA: Links | ❌ | Details |
| | | HTML QA: File Names | 🔵 | Details |
| | | HTML QA: File Order | 🔵 | Details |
| | | HTML QA: Titles | 🔵 | Details |
| | | HTML QA: Print Date and Copyright Statements | 🔵 | Details |
| | | HTML QA: Part Numbers | 🔵 | Details |
| | | HTML QA: File Sizes | 🔵 | Details |
| | | HTML QA: URIs | 🔵 | Details |
| | | HTML QA: Anchors | 🔵 | Details |
| | | HTML QA: Legal Text | 🔵 | Details |
| | | HTML QA: Bad Words | 🔵 | Details |
| PDF QA Report | 🔵 | | | |
| | | PDF QA: Even Pages | 🔵 | Details |
| | | PDF QA: PDF Version | 🔵 | Details |
| | | PDF QA: Appropriate Title | 🔵 | Details |

1401 Detailed Build Report UI

Figure 14B

PDF QA Report

| | | |
|---|---|---|
| PDF QA: Even Pages | ⊗ | Details |
| PDF QA: PDF Version | ⊗ | Details |
| PDF QA: Appropriate Title | ⊗ | Details |
| PDF QA: PDF Author | ⊗ | Details |
| PDF QA: PDF Subject | ⊗ | Details |
| PDF QA: PDF Copyright Protection | ⊗ | Details |
| PDF QA: Fast Web Start | ⊗ | Details |
| PDF QA: Article Threading | ⊗ | Details |
| PDF QA: Contents Bookmark | ⊗ | Details |
| PDF QA: TOC Bookmarks | ⊗ | Details |
| PDF QA: All Pages Same Size | ⊗ | Details |
| PDF QA: Opens to Page 1 | ⊗ | Details |
| PDF QA: Chapter-Oriented Page Numbering | ⊗ | Details |
| PDF QA: Page Numbering Resets | ⊗ | Details |
| PDF QA: Extra Blank Pages | ⊗ | Details |
| PDF QA: Change Bars | ⊗ | Details |
| PDF QA: Doubled Bookmark Numbers | ⊗ | Details |

All JPSDG (E10146-01) Builds

Copyright © 2007, Oracle. All rights reserved.

1401 Detailed Build Report UI

Figure 14C

AUTOMATIC GENERATION AND PUBLICATION OF ONLINE DOCUMENTATION

FIELD OF THE INVENTION

One embodiment is directed generally to document publication, and in particular to the automatic generation and publication of online documentation.

BACKGROUND INFORMATION

Teams of technical documentation writers often author content on a daily basis and this is often a full-time job for them. To get that content reviewed and published, writers often create "books." A "book" refers to a group of electronic files that, together, create an electronic version of a traditional book. For example, a book may include written content, graphics, a glossary, an index, cover art, spine art, etc. However, to get these files in the form of a book writers need to perform various tasks, such as the creation of Hypertext Markup Language (HTML), Portable Document Format (PDF), and Online Help versions of the book, copying of source and output files, running tests against the output files to ensure quality, posting the book for review in the context of a larger online library of books, and publishing a production-ready archive for online publication, backup and recovery purposes. The author typically performs this process manually. However, it is error-prone and can take a large amount of time. If it is not performed, however, the reviewable copies of the book get outdated and reviewers spend a lot of time reviewing old content. Additionally, testing the books late in a release cycle can lead to product release delays.

SUMMARY OF THE INVENTION

One embodiment is a method for building and publishing online documents that comprises reading source files of the online documents, building the source files into a book, publishing the book on a web site, and creating a report describing the result of building the source files into a book.

BRIEF DESCRIPTION OF THE DRAWINGS

FIG. 7 illustrates an example UI of an HTML book;

FIG. 12 illustrates an example UI of a library build report;

FIG. 13 illustrates an example UI of a build series report for a book;

FIG. 14A illustrates an example UI of a detailed build report for an individual book;

FIG. 14B illustrates an additional example UI of a detailed build report for an individual book;

FIG. 14C illustrates an additional example UI of a detailed build report for an individual book.

DETAILED DESCRIPTION

Figure 1A:
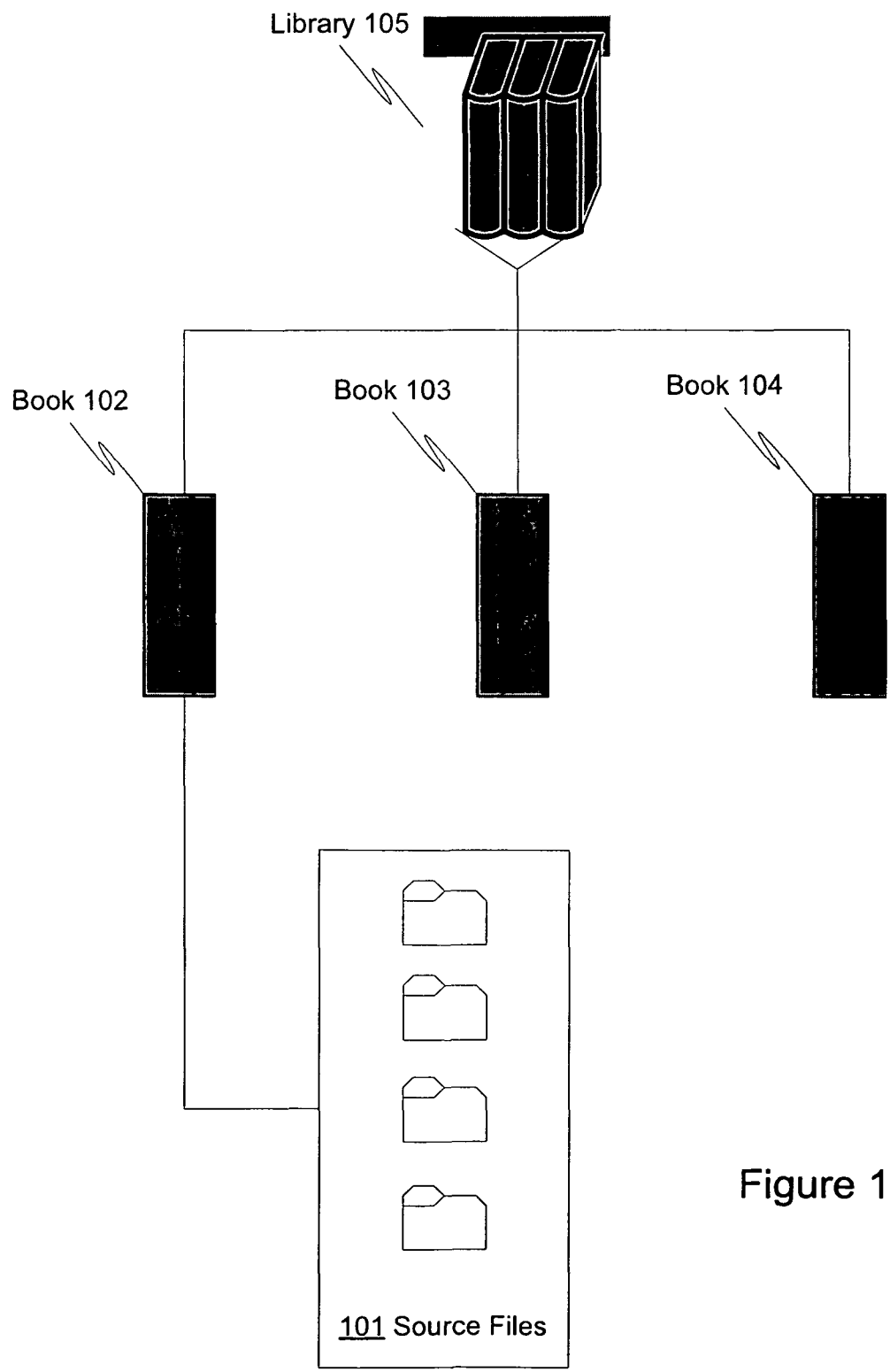
FIG. 1A illustrates a hierarchy of a documentation library.
Figure 1B:
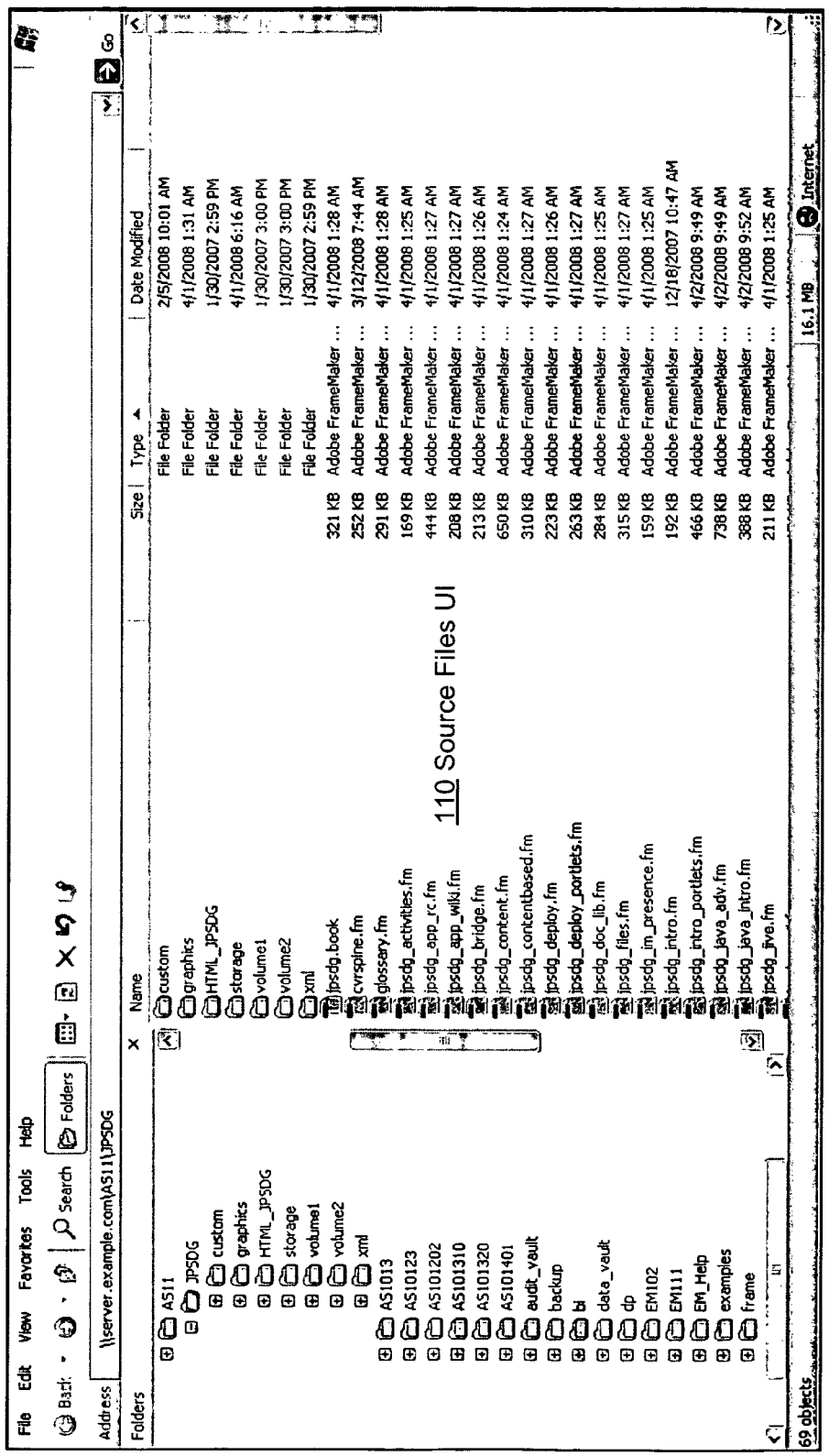
FIG. 1B illustrates an example user interface (UI) depicting the source files.

FIG. 1A illustrates a hierarchy of a documentation library. When authors produce content, they work with a word processing application to produce source files 101. These source files 101 may include book chapters, tables of contents, indices, cover art, book spine, etc. By way of example and not limitation, the source files 101 may be Adobe Framemaker® files. The source files 101 are compiled, or built, into a book 102. Books are singular documents that are published in a common format readable by a web browser. By way of example and not limitation, books 102-104 may be HTML files, PDF files, or Online Help files for Oracle® Help for Java®, Java® Help, WebHelp, or Microsoft® HTML Help. Books 102-104 are assembled together to create a library 105. However, a book may be included in multiple libraries. In general, library 105 can include information regard the location of files, properties of that group of files, attributes, and parameters controlling access and build procedures. Library 105 can then be posted publicly, as on the web, to be offered as an information resource. FIG. 1B illustrates and example UI 110 depicting the source files as seen by an author.

Figure 2:
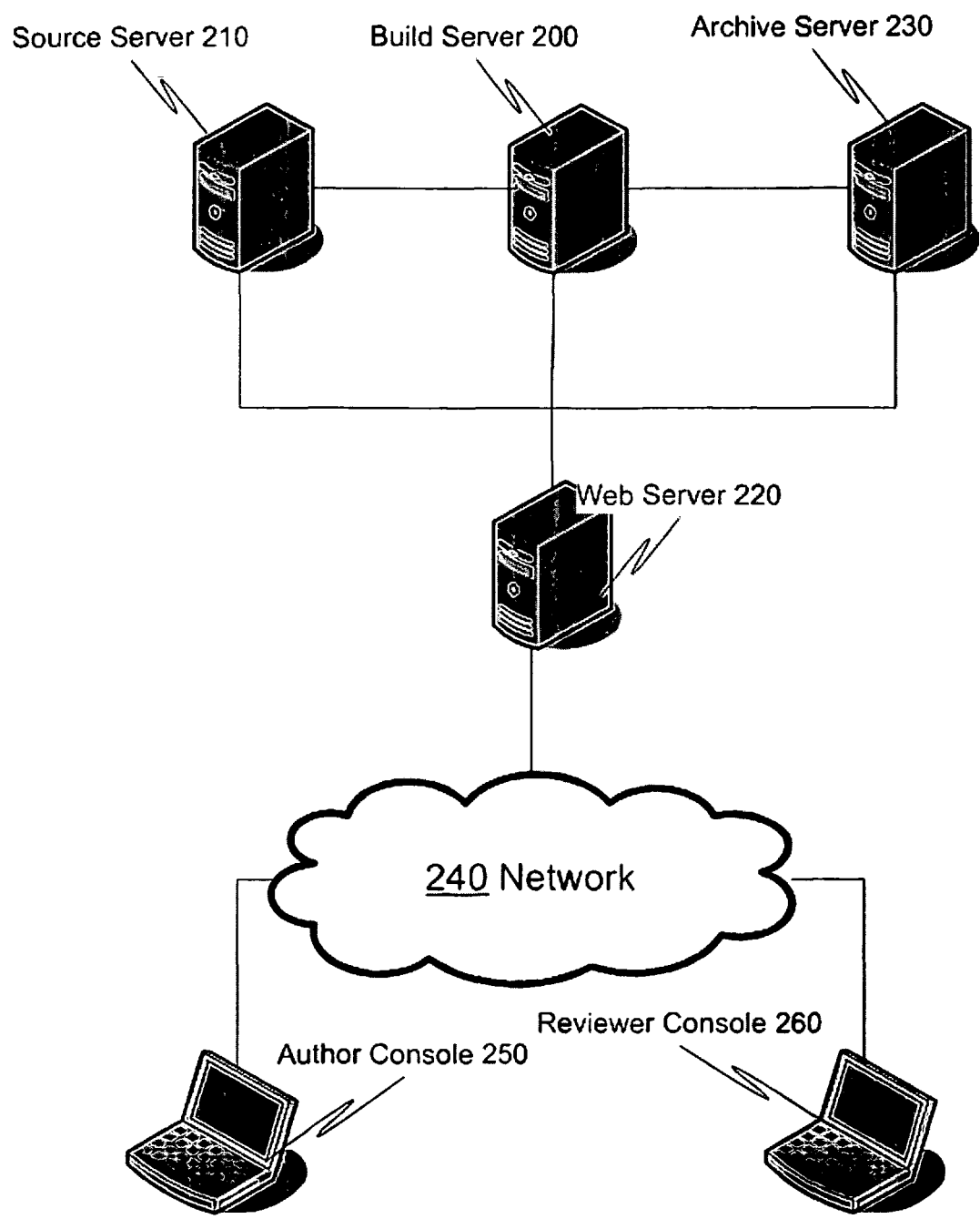
FIG. 2 illustrates a system for building and publishing an online documentation library.

FIG. 2 illustrates a system for building and publishing an online documentation library in accordance with an embodiment. A build server 200 is connected to source server 210, web site server 220, and archive server 230. An author uses console 250 to access web site server 220 via network 240 and initiates a document build by the build server 200. Alternatively, the build may be initiated as a regularly scheduled event. When the author has selected the book or library to build, build server 200 copies the sources files 101 from the source server to build server 200. After running a quality analysis check on the documents, build server 200 prepares a build report and publishes the report on web site server 220. The build server 200 then archives the documents in the archive server 230 and publishes the documents on web site server 220. The author then uses console 250 again to access web site server 220 in order to review the build report. A reviewer uses console 260 to access web site server 220 via network 240 in order to review documents. One of ordinary skill in the art will recognize that build server 200, source server 210, web site server 220, and archive server 230 may be implemented as services on the same physical server.

Figure 3:
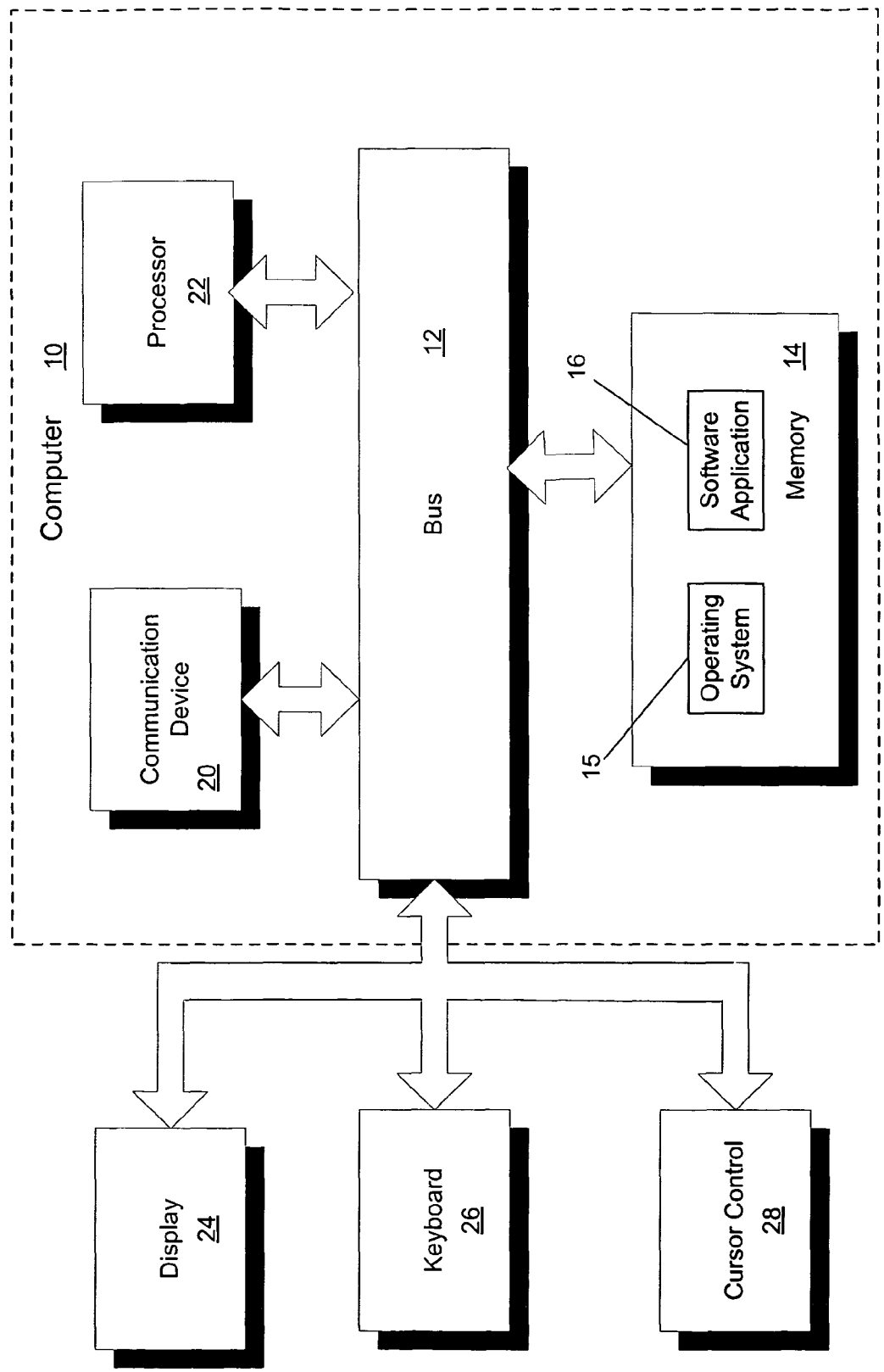
FIG. 3 is a block diagram of a system or computer that can implement embodiments of the invention.

FIG. 3 is a block diagram of a system or computer 10 that can implement embodiments of the invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. In one embodiment, memory 14 stores an operating system 15 and a software application 16 that implements the functionality of build server 200, described in greater detail below. System 10 further includes a communication device 20, such as network interface card, to provide access to a network. Computer-readable media may be any available media that can be accessed by processor 22 and includes both volatile and nonvolatile media, removable and non-removable media, and communication media. Communication media may include computer readable instructions, data structures, program modules or other transport mechanism and includes any information delivery media. System 10 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

Figure 4:
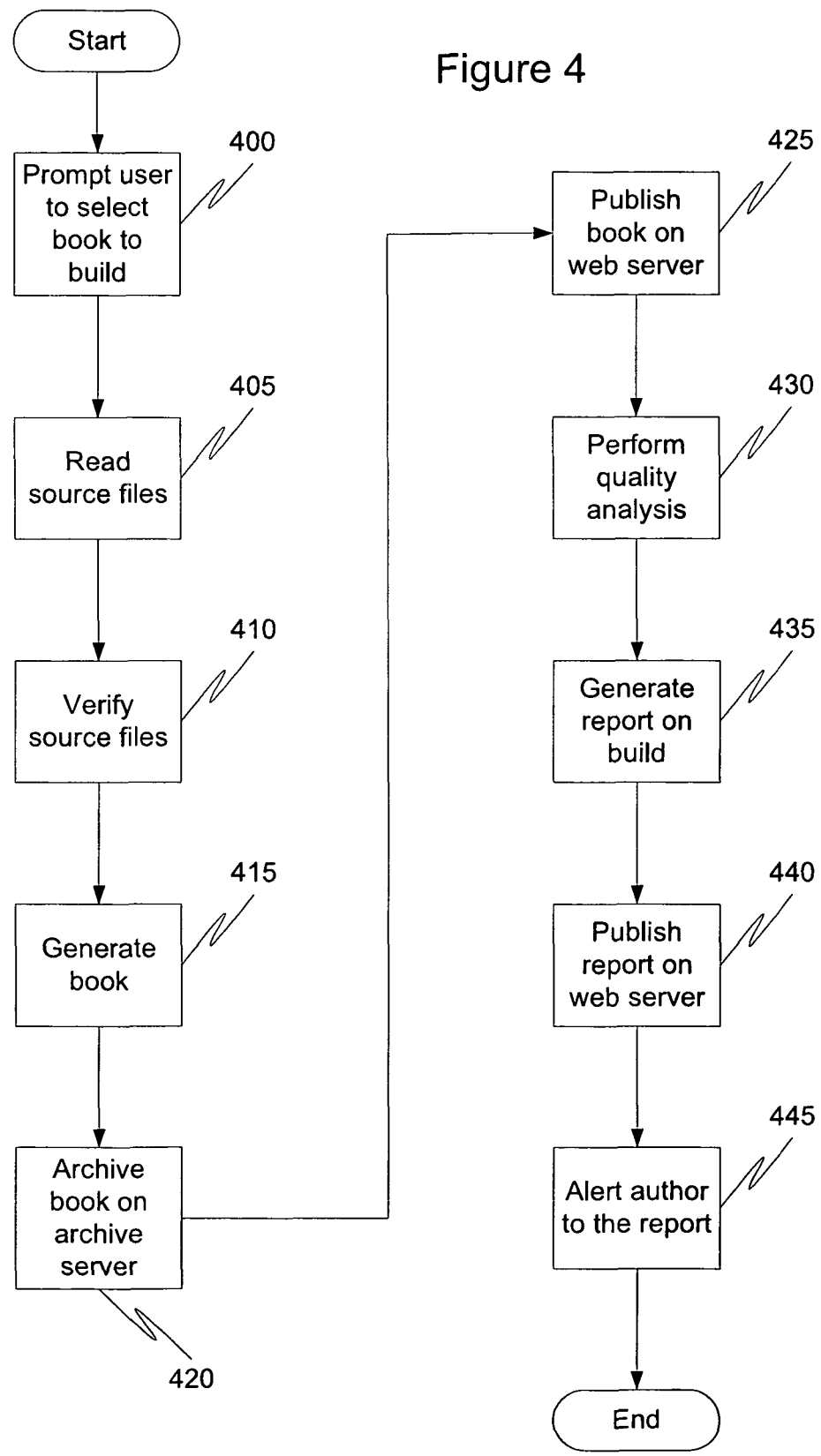
FIG. 4 illustrates a flow diagram of a method for building and publishing an online documentation library.
Figure 5:
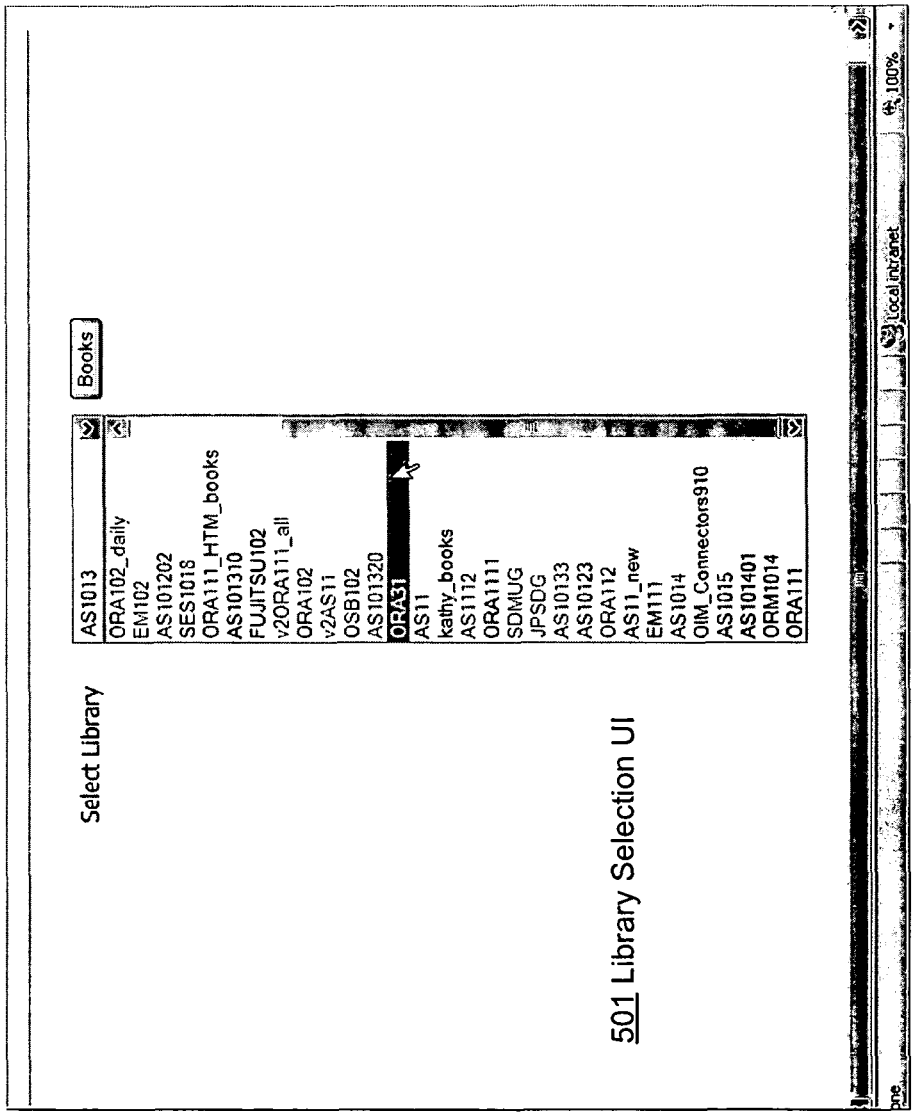
FIG. 5 illustrates an example UI seen by the user when selecting a library.
Figure 6:
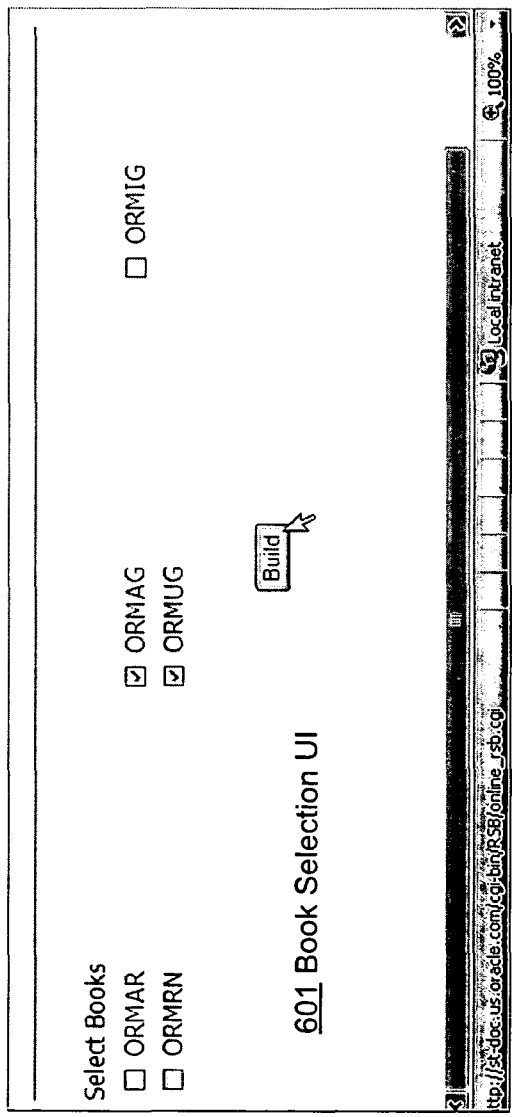
FIG. 6 illustrates an example UI seen by the user when selecting books within the library for building.
Figure 8:
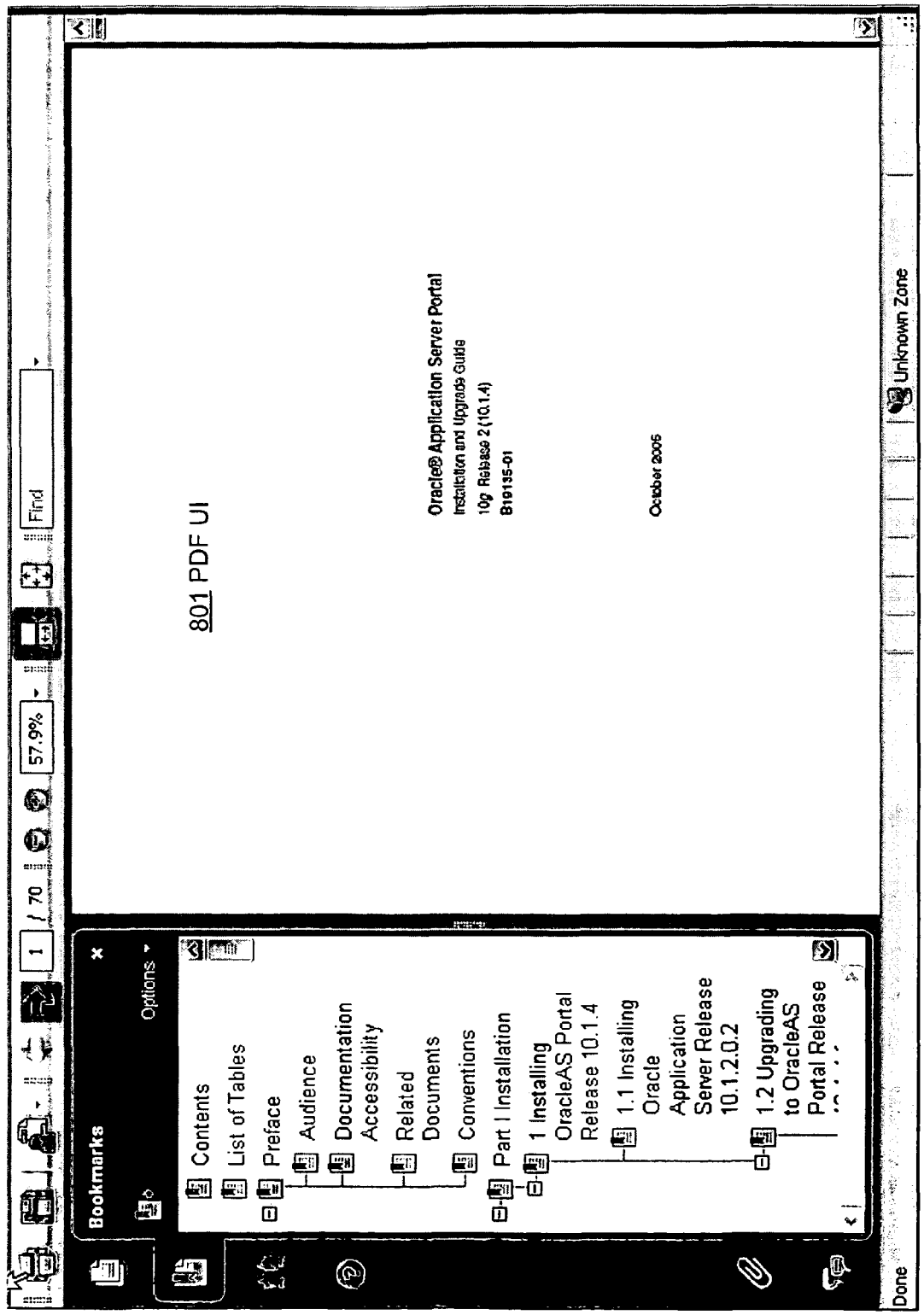
FIG. 8 illustrates an example UI of a PDF book.
Figure 9:
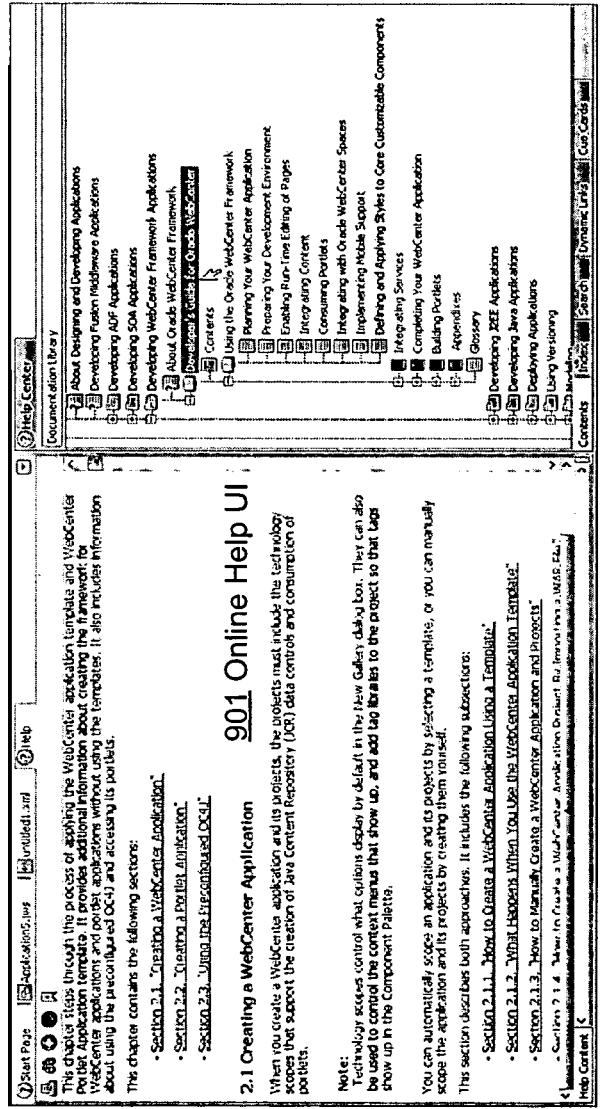
FIG. 9 illustrates and example UI of an Online Help book.
Figure 10:
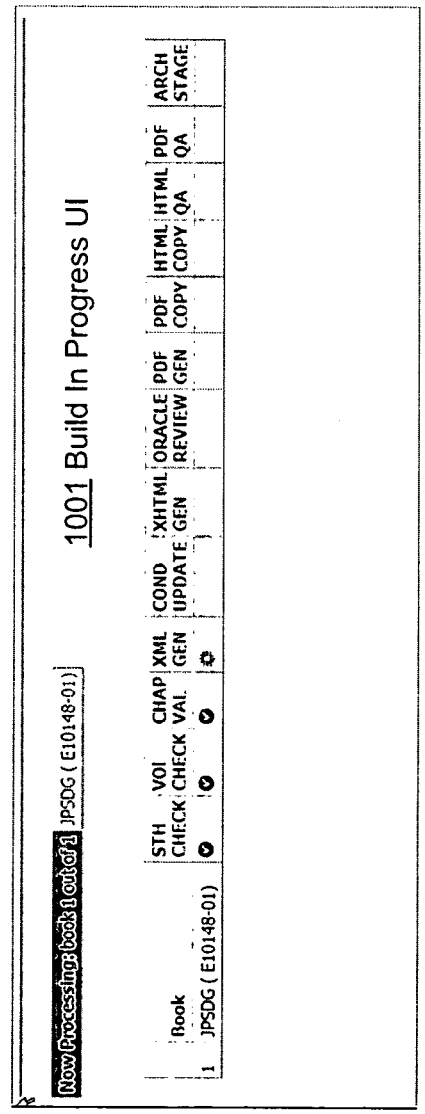
FIG. 10 illustrates an example UI of a build in progress report.

FIG. 4 illustrates a flow diagram of the functionality of build server 200 in accordance with an embodiment when automatically generating and publishing online documents. In one embodiment, the functionality of the flow diagram of FIG. 4 is implemented by software stored in memory and executed by a processor. In other embodiments, the functionality can be performed by hardware, or any combination of hardware and software. Build server 200 prompts the user to select a library and a book or books within that library to build (400). Alternatively, the user may opt to build the entire library. FIG. 5 illustrates an example UI 501 seen by the user when selecting a library, and FIG. 6 illustrates an example UI 601 seen by the user when selecting books within the library for building. Still alternatively, the build server may initiate a build as a regularly scheduled event. For example, a book or library may be scheduled to be rebuilt every night. During the build process, build server 200 reads the source files from source server 210 (405), and verifies that the source files comply with defined parameters (410). For example, this verification may include verifying that the volume and cover spine comply with defined parameters, or that the chapters, color and graphics are consistent with defined parameters. The build process concludes by generating compiled books from the source files (415). These books may include HTML books, PDF books, and online Help books. FIG. 7 illustrates an example UI 701 of an HTML book with links 703. FIG. 8 illustrates an example UI 801 of a PDF book. FIG. 9 illustrates an example UI 901 of an Online Help book. During the build process, there may also be displayed a build-in-progress report that illustrates how much of the build has been completed, such a whether the build process has completed the HTML book, PDF book, or Online help book. FIG. 10 illustrates an example UI 1001 of a build-in-progress report.

Figure 11:
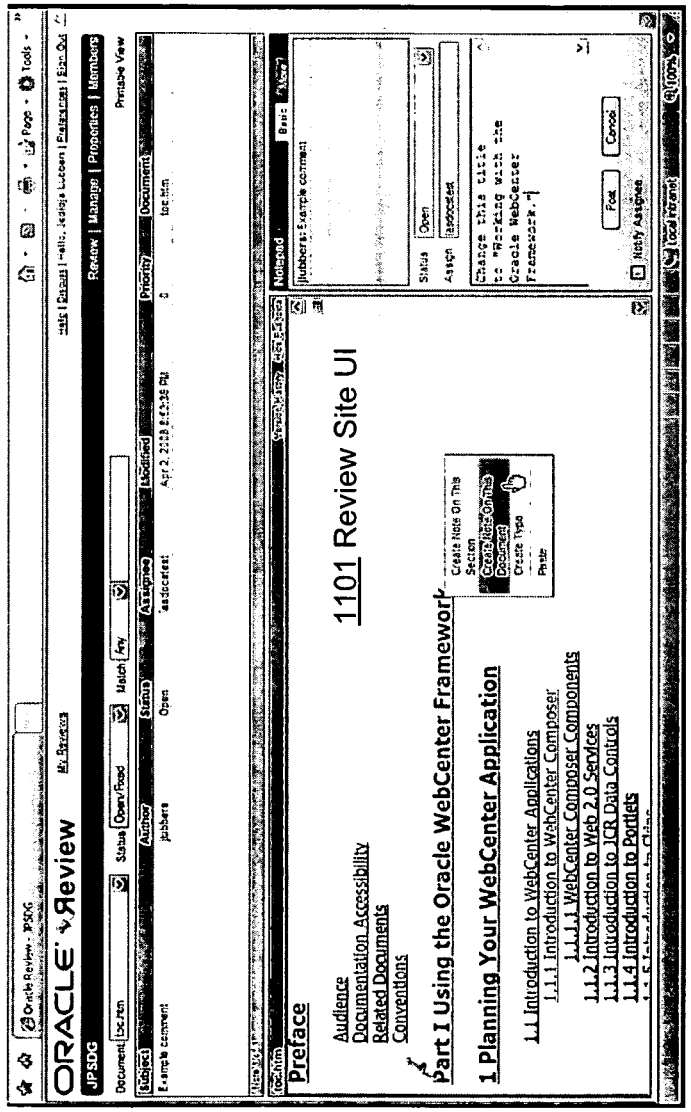
FIG. 11 illustrates an example UI of a review site for a book.

Build server 200 may archive the books by creating an archivable file, such as a ZIP file, testing the integrity of the archivable file, and sending the archivable file to archive server 220 for storage and publication (420). Build server 200 publishes the books on web server 230 so that the books may be reviewed by other interested parties (425). FIG. 11 illustrates an example UI 1101 of a review site for a book published on web server 230. Build server 200 may further perform a quality analysis on the books created (430). For the HTML books, this quality analysis may include, for example, whether there are any defects in the embedded links, the file names, the file order, the titles of the documents, the anchors within the documents, and the Uniform Resource Identifiers (URIs). The analysis may further include, for example, determining whether the print date, copyright statement, legal text, and part numbers are included in the documents. For the PDF books, quality analysis may include, for example, determining whether the documents include the PDF version, an appropriate title, an author, a copyright statement, article threading, and table of contents bookmarks. The quality analysis may further include, for example, ensuring that the documents open to page 1, that there are no blank pages, and that all the pages are the same size. One of ordinary skill in the art will recognize that the quality analysis may be a proprietary program, or a commercially available program initiated by the build server. For example, Xenu's Link Sleuth detects broken links among HTML documents.

Figure 15:
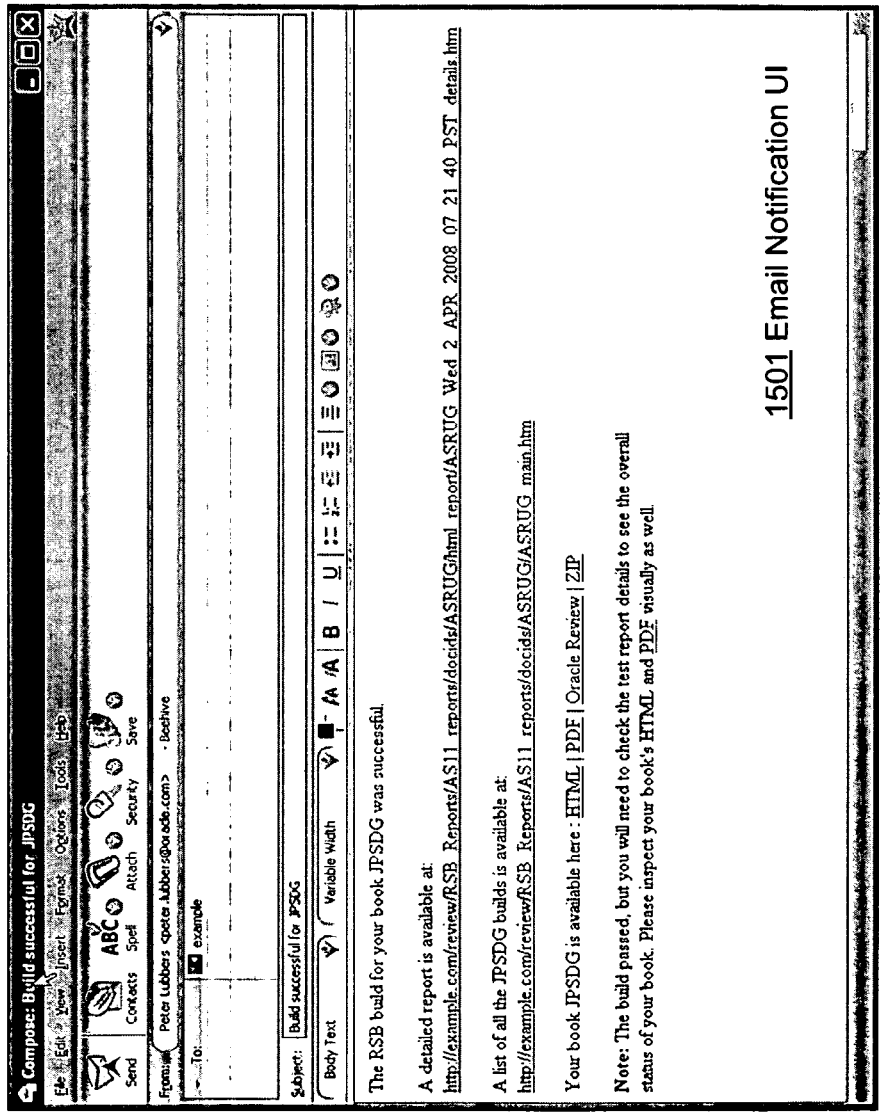
FIG. 15 illustrates an example UI of an email notification of a build.

When the quality analysis concludes, build server 200 generates reports with respect to the library and individual book builds (435). FIG. 12 illustrates an example UI 1201 of a library build report, which may include the document ID, part number, and title column 1210, build date column 1220, build status column 1230, and a build report column 1240 with links 1250 to the build details for each book in the library. FIG. 13 illustrates an example UI 1301 of a build history for an individual book, which may include a build date column 1310, build status column 1320, and a details column 1330 with links 1340 to the build details. FIGS. 14A, 14B, and 14C illustrate an example UI 1401 of a detailed build report. The detailed build report may contain specific information about the build and resulting documents, such as, for example, the results of the HTML quality analysis, the PDF quality analysis, the volume and cover spine verification, the chapters, graphics and color verification, and the archivable file verification. Furthermore, the detailed build report may include an overview noting definitive violations of the quality analysis, as well as those triggered violations that may require human inspection. Build server 200 then publishes the reports on web server 230 (440), and provides the user with a link to the published reports (445). An email notification may also be sent to the author. FIG. 15 illustrates an example UI 1501 of a an email notification notifying the author about the build. As previously mentioned, this process may be automated to execute on a regular interval, for example, nightly, and may be performed for a book, a library of books, and multiple libraries.

By automating the build and archive process, authors are left with more time to produce content. Furthermore, authors are notified of critical errors in their book as they are introduced, not at the end of a long release. Because the review sites are always up-to-date with the latest version, reviewers may rest assured that they are not looking at stale or incorrect information.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A computer implemented method for building and publishing online books, comprising:

storing a plurality of source files in an online library, each source file produced by one or more authors for one or more books, wherein each book is a singular document that is published in a format readable by a web browser;

receiving a selection of a group of the source files stored in the online library to build the book;

reading the selected group of the source files from the online library;

compiling the selected group of the source files;

converting the selected group of the source files to the format readable by the web browser to build the book;

publishing the book on a web site;

performing a quality analysis of the published book;

creating a report describing a result of the quality analysis;
archiving the book on an archive server; and
at predetermined time intervals without user intervention, repeating the reading, compiling, converting, publishing, performing the quality analysis, creating the report and archiving the book, to provide a latest version of the book, and generating a notification of the report comprising a link to the report to the one or more authors of the book.

2. The method of claim 1, wherein the format readable by the web browser is at least one of a portable document format (PDF), a hypertext markup language (HTML), and an online help manual format.

3. The method of claim 1, wherein performing the quality analysis includes determining whether requisite data is included in the book.

4. The method of claim 1, wherein performing the quality analysis includes determining whether the book conforms to a predefined format.

5. The method of claim 1, wherein performing the quality analysis includes determining whether converting the source files was successful.

6. The method of claim 1, wherein creating the report includes stating whether human inspection of the book is recommended to correct a defect.

7. The method of claim 1, wherein creating the report includes stating whether creating the archive file was successful.

8. The method of claim 1, further comprising publishing the report on a web site and directing an author of the book to the location of the report.

9. The computer implemented method of claim 1, wherein the report includes at least one of:
   a build date;
   a build status;
   a link to a detailed build report;
   a defect of an embedded link; or
   a defect in a file name.

10. A non-transitory computer-readable medium having instructions stored thereon that, when executed by a processor, causes the processor to build and publish online books, the build and publish comprising:
    storing a plurality of source files in an online library, each source file produced by one or more authors for one or more books, wherein each book is a singular document that is published in a format readable by a web browser;
    receiving a selection of a group of the source files stored in the online library to build the book;
    reading the selected group of the source files from the online library;
    compiling the selected group of the source files;
    converting the selected group of the source files to the format readable by the web browser to build the book;
    publishing the online book on a web site;
    performing a quality analysis of the published online book;
    creating a report describing the result of the quality analysis;
    archiving the book on an archive server; and
    at predetermined time intervals without user intervention, repeating the reading, compiling, converting, publishing, performing the quality analysis, creating the report and archiving the book, to provide a latest version of the book, and generating a notification of the report comprising a link to the report to the one or more authors of the book.

11. The non-transitory computer-readable medium of claim 10, wherein the format readable by the web browser is at least one of a portable document format (PDF), a hypertext markup language (HTML), and an online help manual format.

12. The non-transitory computer-readable medium of claim 10 wherein creating the report includes stating whether creating the archive file was successful.

13. The non-transitory computer-readable medium of claim 10, wherein the report includes at least one of:
    a build date;
    a build status;
    a link to a detailed build report;
    a defect of an embedded link; or
    a defect in a file name.

14. A system for building and publishing online books, comprising:
    a processor coupled to a memory;
    a source server including source files, each source file produced by one or more authors for one or more books, wherein each book is a singular document that is published in a format readable by a web browser;
    a build server that comprises the processor and the memory and that reads a group of the source files selected from the source server to build the book, compiles the group of the source files, and converts the group of the source files to the format readable by the web browser to build the book;
    a web server that publishes the book and the report; and
    an archive server that archives the book;
    wherein the build server performs a quality analysis of the published book, archives the book on an archive server, and creates a report of the quality analysis; and
    at predetermined time intervals without user intervention, repeating the reading, compiling, converting, publishing, performing the quality analysis, creating the report and archiving the book, to provide a latest version of the book, and generating a notification of the report comprising a link to the report to the one or more authors of the book.

15. The system of claim 14, wherein the format readable by the web browser is at least one of a portable document format (PDF), a hypertext markup language (HTML), and an online help manual format.

16. The system of claim 14, wherein the report includes at least one of:
    a build date;
    a build status;
    a link to a detailed build report;
    a defect of an embedded link; or
    a defect in a file name.

17. A computer system for building and publishing online books, comprising:
    computer server means for storing a plurality of source files, each source file produced by one or more authors for one or more books, wherein each book is a singular document that is published in a format readable by a web browser;
    computer server means for reading a group of the source files selected from an online library to build the book;
    computer server means for compiling the group of the source files;
    computer server means for converting the group of the source files to the format readable by the web browser to build the book;
    computer server means for publishing the book on a web site;
    computer server means for performing a quality analysis of the published book; and computer server means for creating a report describing a result of the quality analysis, archiving the book on an archive server, and at predetermined time intervals without user intervention, repeating the reading, compiling, converting, publishing, performing the quality analysis, creating the report and archiving the book, to provide a latest version of the book, and generating a notification of the report comprising a link to the report to the one or more authors of the book.

18. The system of claim 17, wherein the format readable by the web browser is at least one of a portable document format (PDF), a hypertext markup language (HTML), and an online help manual format.

19. The system of claim 17, wherein the report includes at least one of:
- a build date;
- a build status;
- a link to a detailed build report;
- a defect of an embedded link; or
- a defect in a file name.

* * * * *

UNITED STATES PATENT AND TRADEMARK OFFICE
CERTIFICATE OF CORRECTION

PATENT NO. : 8,463,821 B2
APPLICATION NO. : 12/103648
DATED : June 11, 2013
INVENTOR(S) : Lubbers et al.

Page 1 of 1

It is certified that error appears in the above-identified patent and that said Letters Patent is hereby corrected as shown below:

In the Specification:

In column 4, line 31, delete "a an email" and insert -- an email --, therefor.

Signed and Sealed this
Eighth Day of October, 2013

Teresa Stanek Rea
*Deputy Director of the United States Patent and Trademark Office*